US012792566B2

(12) United States Patent
Kumar et al.

(10) Patent No.: US 12,792,566 B2

(45) Date of Patent: Nov. 10, 2026

(54) AUTOMATE ADAPTION FRAMEWORK

(71) Applicant: SAP SE, Walldorf (DE)

(72) Inventors: Ashish Kumar, Bangalore (IN); Anal Jyoti Goswami, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/940,258

(22) Filed: Nov. 7, 2024

(65) Prior Publication Data

US 2026/0127140 A1 May 7, 2026

(51) Int. Cl.
*G06F 16/00* (2019.01)
*G06F 16/16* (2019.01)
*G06F 16/23* (2019.01)

(52) U.S. Cl.
CPC ............ *G06F 16/164* (2019.01); *G06F 16/23* (2019.01)

(58) Field of Classification Search
None
See application file for complete search history.

(56) References Cited

U.S. PATENT DOCUMENTS 7,383,322 B2 * 6/2008 Chiang ................. G06F 40/143 709/219
8,495,099 B2 * 7/2013 Maim ................... G06F 40/194 707/794
9,047,106 B1 * 6/2015 Joyce ...................... G06F 8/315
9,256,772 B2 * 2/2016 Yeakley .............. G06F 16/1744
9,361,400 B2 * 6/2016 Zhao ....................... G06F 16/81
9,846,716 B1 * 12/2017 Scott ..................... G06F 16/955
9,892,281 B1 * 2/2018 Scott ..................... G06F 16/955
9,953,095 B1 * 4/2018 Scott ..................... G06F 16/955
10,942,969 B2 * 3/2021 Minagi ................... G06F 16/81
11,755,647 B2 * 9/2023 Falcetano ............... G06F 16/84 707/756
11,921,783 B1 * 3/2024 Mahapatra .............. G06F 16/84
12,443,655 B2 * 10/2025 Mahapatra .............. G06F 16/84
2003/0177442 A1 * 9/2003 Lou ....................... G06F 40/194 715/234
2004/0205509 A1 * 10/2004 Lou ....................... G06F 40/194 715/205
2004/0205576 A1 * 10/2004 Chikirivao ............. G06F 16/86 715/239
2006/0128160 A1 * 6/2006 Yoo ......................... G03F 7/427 257/E21.256
2007/0152058 A1 * 7/2007 Yeakley .................. G06F 16/81 235/375

(Continued)

*Primary Examiner* — Jean M Corrielus

(74) *Attorney, Agent, or Firm* — Buckley, Maschoff & Talwalkar LLC

(57) ABSTRACT

According to some embodiments, systems and methods are provided including receiving an updated first XML file and one or more additional XML files from a data store, wherein each of the one or more XML files forms an updated first XML file-additional XML file pair with the updated first XML file; determining, for each pair, an identifier of the updated first XML file matches an identifier of the additional XML; generating an XML similarity score for each pair, wherein the XML similarity scores generated for each pair are generated in parallel; determining the XML similarity score exceeds a threshold value; and generating a similarity notification indicating any additional XML files that are similar to the updated first XML file. Numerous other aspects are provided.

17 Claims, 10 Drawing Sheets

(56) References Cited

U.S. PATENT DOCUMENTS

| | | | | |
|---|---|---|---|---|
| 2007/0240034 | A1* | 10/2007 | Sthanikam | G06F 40/194<br>715/234 |
| 2009/0083314 | A1* | 3/2009 | Maim | G06F 40/194 |
| 2009/0112901 | A1* | 4/2009 | Friedman | G06F 16/88 |
| 2012/0016913 | A1* | 1/2012 | Tamm | G06F 16/2453<br>707/805 |
| 2012/0194320 | A1* | 8/2012 | Yeakley | G06F 16/1744<br>340/10.1 |
| 2015/0029002 | A1* | 1/2015 | Yeakley | G06F 3/04842<br>340/10.51 |
| 2016/0154986 | A1* | 6/2016 | Yeakley | G06F 16/81<br>235/462.46 |
| 2017/0169000 | A1* | 6/2017 | Zarzar | G06F 40/166 |
| 2017/0364721 | A1* | 12/2017 | Yeakley | G06F 16/1744 |
| 2018/0174219 | A1* | 6/2018 | Jadhav | G06Q 30/0631 |
| 2019/0026388 | A1* | 1/2019 | Minagi | G06F 16/835 |
| 2020/0226052 | A1* | 7/2020 | Fernandes | G06F 11/3684 |
| 2021/0165652 | A1* | 6/2021 | Danthalapelli | G06F 8/73 |
| 2022/0179905 | A1* | 6/2022 | Falcetano | G06F 16/84 |
| 2025/0094492 | A1* | 3/2025 | Mahapatra | G06F 16/84 |

* cited by examiner

AUTOMATE ADAPTION FRAMEWORK

BACKGROUND

A software provider generates software products to address a need for the software provider itself, or a need of other organizations. With the generated software products, one or more documents may be provided detailing how the different elements of the software products work per industry standards. In some instances, different products used by the provider/organization may use the same elements. Further, one or more automates may be provided for at least some of the documents. Each automate may be used to test the execution of the aspect of the software product described by the document. In some cases, the organization tailored the software product to suit the organization's needs and the automate may be used as a reference to build organization-specific automates to test elements tailored in the software product. The automate may be used after installation and/or after an update to the software. In a case of any changes to the software product (e.g., updates and or organization-specific changes to tailor the software product), the automate may need to be updated as well. Any changes to any document (e.g., based on changes to the software product) may result in an adaptation of an existing automate, so that the end-user has the updated copy of the document and the automates available. Conventionally, each automate is adapted individually, even when there are common elements in the automates that have been changed. This adaptation approach is time- and other resource-consuming, and may be error prone.

Systems and methods are desired to facilitate the adaptation of common automates.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
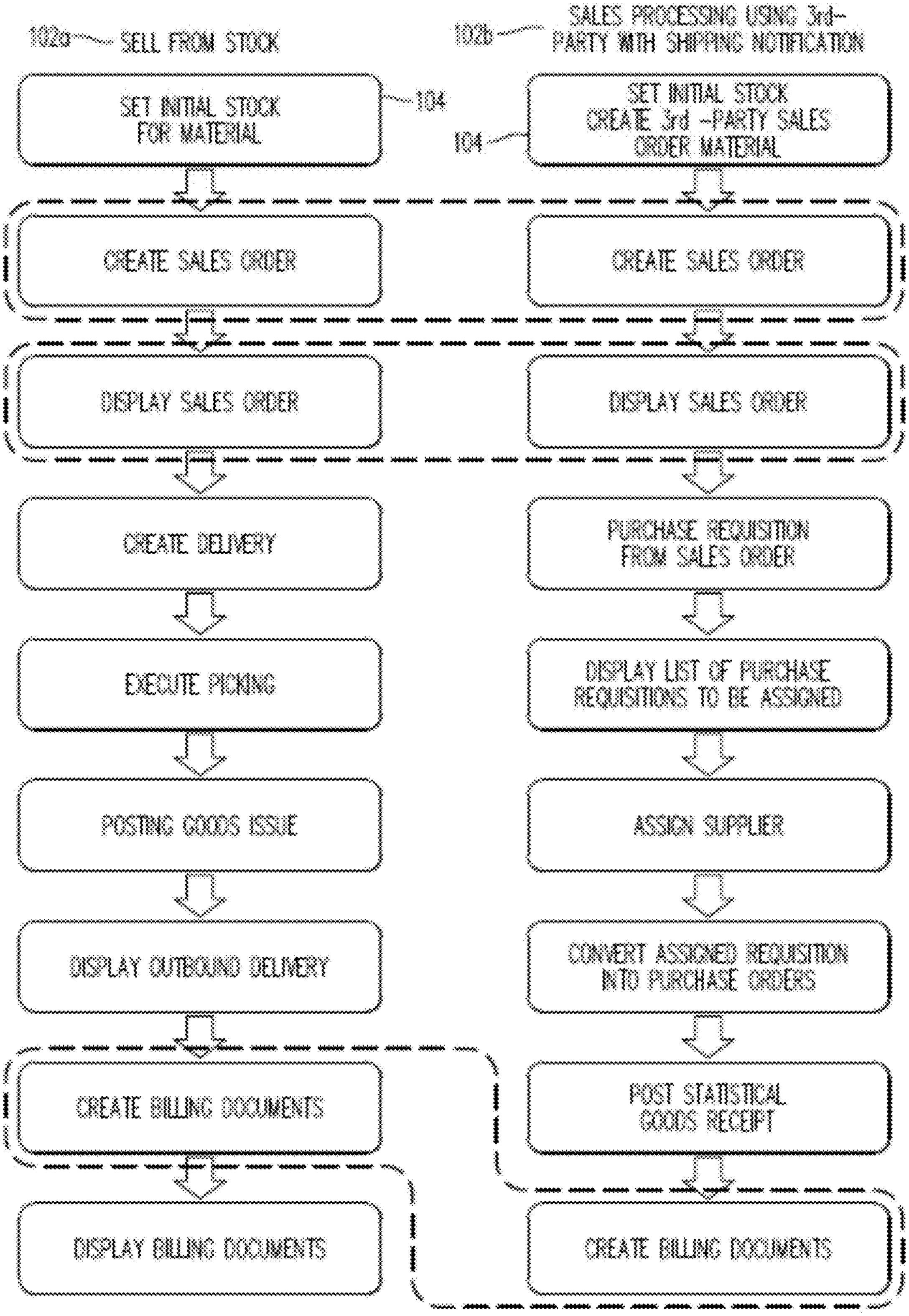
FIG. 1 is a diagram illustrating non-exhaustive examples of Best Practice Scenarios.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, a software provider generates software products to address a need for the software provider itself, or a need of other organizations. The software provider may also provide Best Practice documents that support implementation of the software. The Best Practice documents may be standardized content that may be accessible to the user and may offer the user guidelines, recommendations and proven methodologies for implementing the software. The Best Practice documents may serve as reference for users looking to follow established industry best practices when working with given software. The Best Practice documents may include predefined processes that may be referred to as "scope items", as well as test procedures. The scope items may combine sub-processes that share an application system landscape, require an aligned upgrade cycle, or serve the same functional purpose. The software provider may also provide test scripts ("automates") of these documents, which may be used to perform regression testing, to perform other testing, and to be used as reference for users to customize the automate to suit their needs. As a non-exhaustive example, a software provider may include over 700 scope items, and over 400 automates that may be readily available for consumption by users of a public cloud, for example.

FIG. 1 includes two non-exhaustive examples of scope items—a Sell from Stock scope item 102*a* and a Sales Processing using Third-Party with Shipping Notification scope item 102*b*. Each scope item includes one or more sub-processes 104 used in the implementation of the scope item. Continuing with this example, execution of the software for the Sell from Stock scope item includes subprocesses of: setting initial stock for material, creating a sales order, displaying the sales order, creating delivery, executing picking, posting goods issue, displaying outbound delivery, creating billing documents and displaying billing documents; while execution of the software for the Sales Processing using Third-Party with Shipping Notification scope item includes subprocesses of: setting initial stock create third-party sales order material, creating a sales order, displaying the sales order, purchase requisition from sales order, displaying a list of purchase requisitions to be assigned, assigning a supplier, converting assigned requisitions into purchase orders, posting statistical goods receipt and creating billing documents.

In some instances, certain sub-processes 104 and corresponding test procedures may be common across different scopes. Continuing with this non-exhaustive example, both scope items 102*a* and 102*b* include a Create Sales Order sub-process 104, a Display Sales Order sub-process 104, and a Create Billing Documents sub-process 104, indicated by the dotted circle.

Conventionally, in a case one sub-process is updated, the common sub-process in other scope items is identified and a decision may be made whether to update the sub-process in those other scopes. If there is a decision to make the change, those changes are made individually in each sub-process. Further, any change (adaptation) in a sub-process may result in an individual adaptation of the existing and respective automate, so that a user has the updated copy of the document and automates available. Continuing with the non-exhaustive example above, consider an adaptation in the Create Sales Order sub-process in the Sell from Stock scope item 102*a*. The user then needs to consider over 700 other scope items to determine whether any of them have the Create Sales Order sub-process. In this case, at least the Sales Processing using Third-Party with Shipping Notification scope item 102*b* is identified as also having the Create Sales Order sub-process as a common sub-process. The user then needs to decide if they want to make a similar change to the common Create Sales Order sub-process in the Sales Processing using Third-Party with Shipping Notification sub-process. In a case they do want to make the change, the sub-process is individually adapted. Then if the scope item has an automate, that automate is also adapted. Conventionally there is no mechanism where the automate is adapted for one scope and that adaptation is automatically reflected in other scopes that have similar sub-processes, as such, this requires a large manual effort and resources. For example, this individual process may occur manually hundreds of times for a single updated automate.

Further, while the scope items included in the Best Practice documents represent standard industry practices, a user may tailor the pre-defined scope items and corresponding automates to suit their needs, making them organization-specific. In such cases, in addition to adapting their sub-processes, the user may need to individually change their organization-specific automates, as well, for any change to the software provider automate.

To address these problems, an automate adaptive framework provides for the re-use of automate changes of common sub-processes at a mass level based on a similarity score. Embodiments provide for the creation of a repository of XML files of different automates. In a case a scope item undergoes any changes that affect the automate (e.g., changes in test procedures/test steps), or in a case the automate directly receives changes (e.g., a new release, etc.) embodiments provide for those changes to be made in the appropriate XML file to reflect those changes. The adaptation of the automate results in new XML text being generated and the XML file for that automate is updated and saved in the repository of XML files. Then, a comparator tool of the automate adaptive framework identifies XML documents for automates of other similar sub-processes. The automate adaptive framework then automatically updates the XML text in the identified XML documents for automates of other similar sub-processes in response to user request of the update. Further, embodiments avoid having to adapt each automate one-by-one, as the comparator tool compares multiple automates/sub-processes at a same time. The automate adaptive framework may be integrated in a web-based application for easy consumption by users. One or more embodiments reduce the overall time of adaptations and maintenance of any best practice automate.

Figure 2:
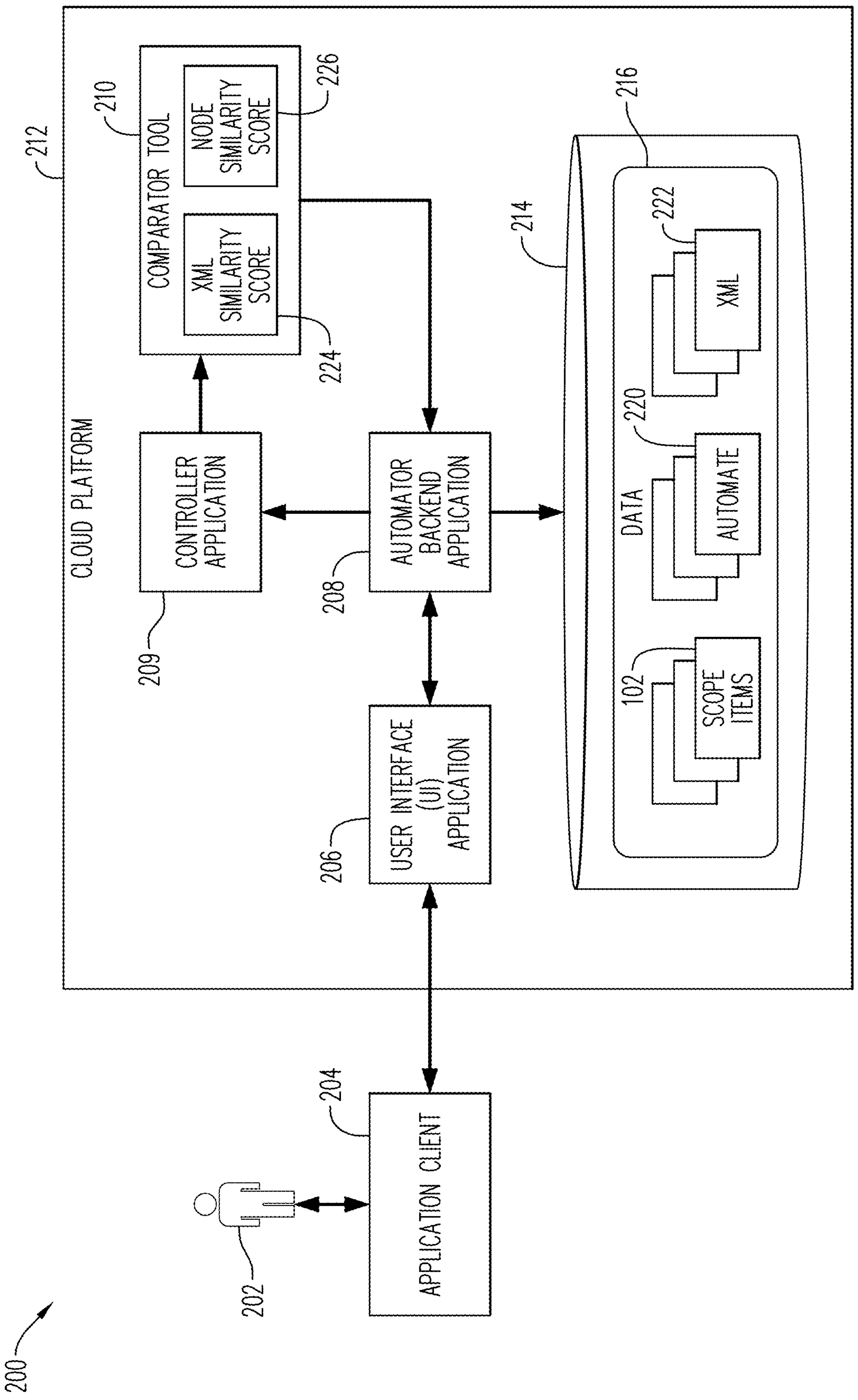
FIG. 2 is a block diagram of an architecture cording to some embodiments.

FIG. 2 is a high-level block diagram of an automate adaptive framework or system architecture 200 according to some embodiments. Embodiments are not limited to architecture 200.

The illustrated elements of system architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 200 are implemented by a single computing device, and/or two or more elements of system architecture 200 are co-located. One or more elements of system architecture 200 may be implemented using cloud-based resources, and/or other systems which apportion computing resources elastically according to demand, need, price, and/or any other metric.

Architecture 200 includes an end user 202, an application client 204, a user interface (UI) application 206, an automator backend application 208, a controller application 209, a comparator tool 210, a cloud platform 212, and a data store 214.

The cloud platform 212 provides any suitable environment that allows clients 202 to communicate with the UI application 206, described further below, executing on the cloud platform 212. The cloud platform 212 may also support scaling of comparator tool components.

Cloud platform 212 may provide application services (e.g., via functional libraries) which applications may use to manage and query the data of data store 214. The application services can be used to expose the database data model, with its tables, hierarchies, views and database procedures, to clients. In addition to exposing the data model, cloud platform 212 may host system services such as a search service.

The end user/application client 202/204 may comprise one or more individuals or devices executing program code of a software application for presenting and/or generating user interfaces to allow interaction with the comparator tool 210. Non-exhaustive examples of end users may be administrators/developers, end users, etc.

For example, end user 202 may execute the application client 204 to request and receive a Web page (e.g., in HTML format) from the cloud platform 212 to access the comparator tool 210 via HTTP, HTTPS, and/or WebSocket, and may render and present the UI according to known protocols. The client 202/204 may also or alternatively present user interfaces by executing a standalone executable file (e.g., an .exe file) or code (e.g., a JAVA applet) within a virtual machine.

The UI application 206 may provide any suitable interfaces through which users 202 may communicate with the comparator tool 210, or application executing on a cloud platform, or applications executing thereon. Presentation of the user interface may comprise any degree or type of rendering, depending on the type of user interface code generated by UI system 206. The cloud platform 212 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications may execute on the cloud platform 212. Applications may comprise executable program code (e.g., compiled code, scripts, etc.) executing on the cloud platform 212 to receive queries/requests from users 202/204 and provide results to users 202/204 based on the data 216 of data store 214, and the output of the comparator tool 210. As will be described further below, the applications may comprise web applications which execute to provide desired functionality. User 202 instructs the system architecture 200, as is known, via an application, for example, to automatically update the XML files. The application may comprise program code executable by a processor to provide functions to end users 202/204 based on coded logic and on data 216 stored in data store 214. Data 216 may comprise tabular data stored in a columnar or row-based format, object data, or any other type of data this is or becomes known. Moreover, the data may be indexed and/or selectively replicated in an index to allow fast searching and retrieval thereof. Data store 214 may support multi-tenancy to separately support multiple unrelated clients by providing multiple logical database systems which are programmatically isolated from one another. Data store 214 may comprise any suitable storage system such as a database system, which may be distributed as is known in the art. Data store 214 (and other databases herein) represent any suitable combination of volatile (e.g., Random Access Memory) and non-volatile (e.g., fixed disk) memory used by the system to store the data.

Data store 214 may comprise any query-responsive data source or sources that are or become known, including but not limited to a structured-query language (SQL) relational database management system. Data store 214 may comprise a relational database, a multi-dimensional database, an Extensible Markup Language (XML) document, or any other data storage system storing structured and/or unstructured data.

The automator backend application 208 is an automation application that allows users to manage application processes. The automator backend application 208 may integrate cross-application processes. Here, the automator backend application 208 integrates the controller application 209, the comparator tool 210 and the data store 214. The automator backend application 208 receives the end user request via the application client 204 and UI application 206. The automator backend application 208 processes the received request and may handle tasks such as data retrieval, and storage of data relevant to the comparator tool 210. The automator backend application 208 may transmit the request to the controller application 209. The controller application 209 is a controller that can be defined to enable an application (e.g., comparator tool) to be called via a URL. The controller application 209 manages the HTTP request response cycle and manages access to the comparator tool 210.

The comparator tool 210 transmits data to the automator backend application 208 for storage in the data store 214 and/or transmission of results to the user 202. The comparator tool 210 assesses matching of two XMLs to generate an XML similarity score. The comparator tool 210 then compares the XML similarity score to a threshold to determine whether the two XMLs are similar enough that a user may want the update to the first XML included in the second XML. As part of the generation of the XML similarity score, the comparator tool 210 generates node similarity scores, comparing the nodes in the two XMLs, as further described below. The comparator tool 210 assesses multiple XML pairs in parallel in a 1:n assessment.

Figure 3:
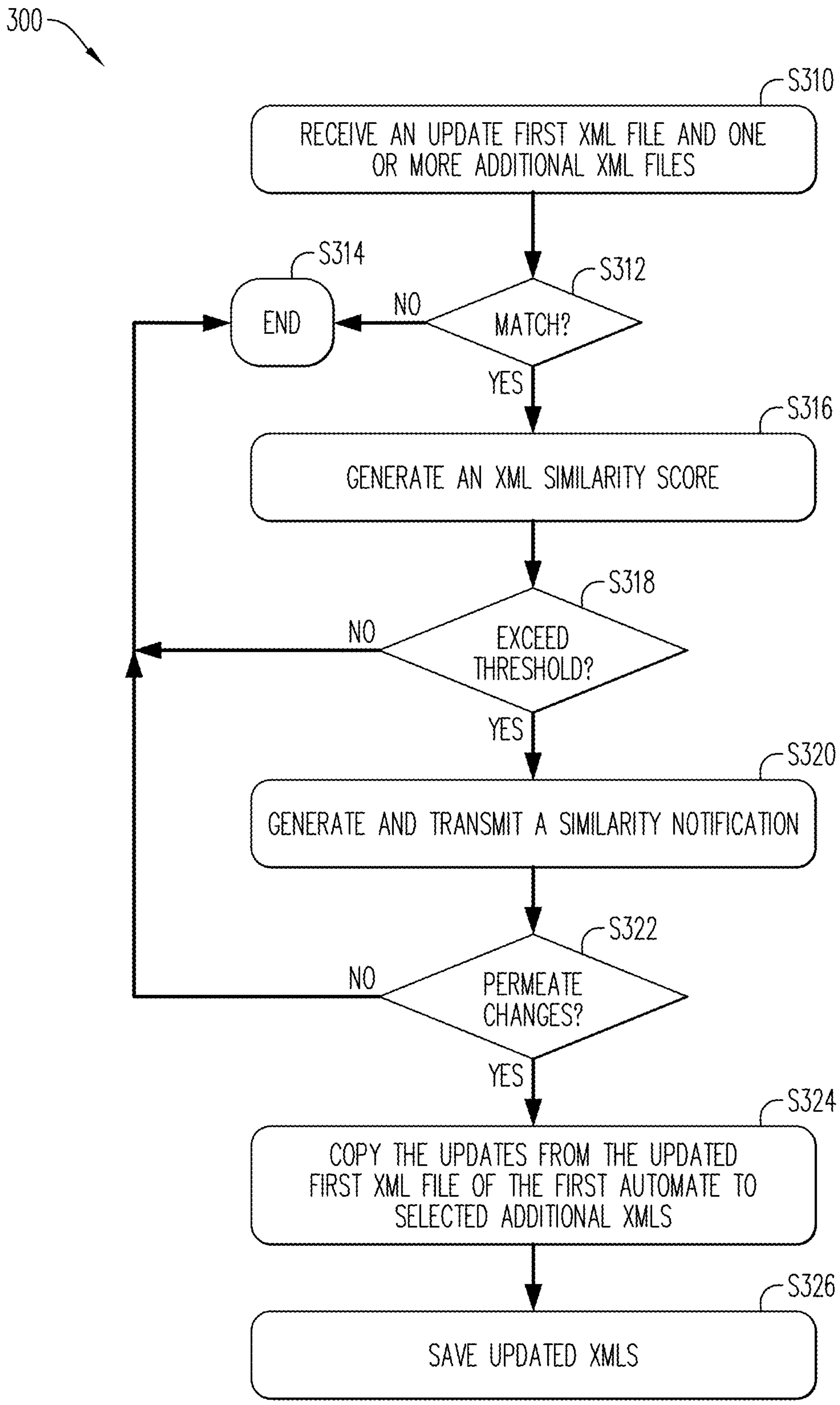
FIG. 3 is a flow diagram of a first process according to some embodiments.

FIG. 3 illustrates a process 300 for updating other XML files in accordance with an example embodiment. The process 300, and other processes described herein (800), may be performed by a database node, a cloud platform, a server, a computing system (user device), a combination of devices/nodes, or the like, according to some embodiments. In one or more embodiments, the system architecture 200 may be conditioned to perform the process 300, 800 and other processes described herein, such that a processing unit 1035 (FIG. 10) of the system architecture 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to execution of the process 300, one or more scope items have been generated, and corresponding automates 220 for at least some of those scope items have been generated. As described above, the scope item includes one or more sub-processes 104 used in the implementation of the scope item. The automate 220 is a test script including a set of instructions that automatically evaluates the functionality of software's execution of the scope item via evaluation of the execution of the scope item's sub-processes. The goal of the automate 220 is to ensure when executed the scope item behaves as expected. In particular, the automate 220 describes in technical detail the components and sequence of activities that are to be tested for a particular process/scope item. The automate 220 may include one or more steps for testing each sub-process 104, where each sub-process 104 has its own respective steps for testing. The steps may be saved in the metadata for the sub-process of the automate.

Continuing with the non-exhaustive example described above with respect to FIG. 1, the Sell from Stock scope item 102*a* includes the following sub-processes 104: setting initial stock for material, creating a sales order, displaying the sales order, creating delivery, executing picking, posting goods issue, displaying outbound delivery, creating billing documents and displaying billing documents. An automate 220 corresponding to this Sell from Stock scope item 102*a* includes a plurality of parts that respectively test whether the sub-processes execute as expected via execution of the corresponding steps.

Figure 4:
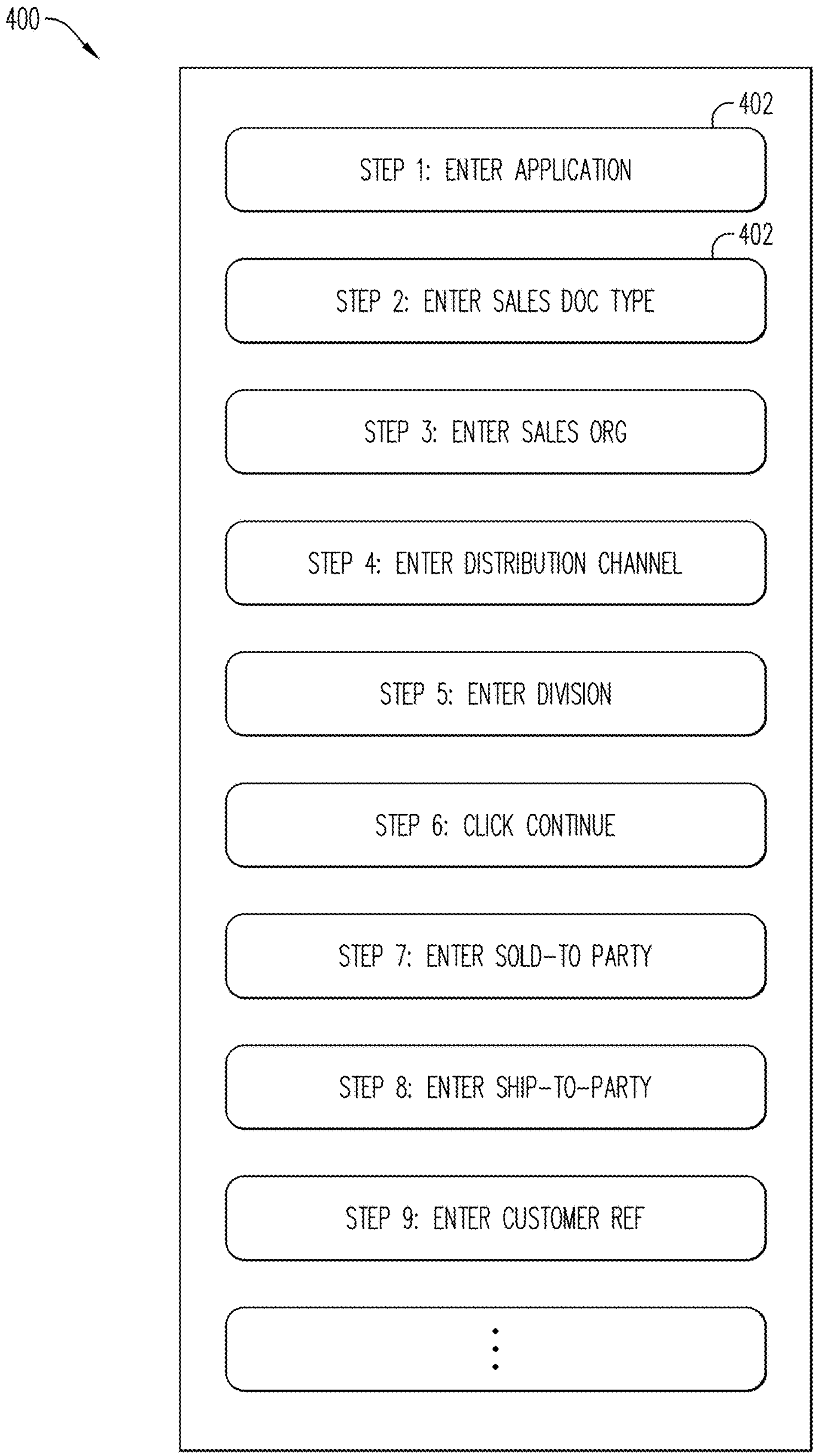
FIG. 4 is a non-exhaustive example of metadata for the steps/actions of the sub-process part of the automate according to some embodiments.

As a non-exhaustive example, the Create Sales Order sub-process part of the automate 220 for the Sell from Stock scope item 102*a* includes a plurality of steps 402 (FIG. 4). These steps 402 are included in metadata 400 (FIG. 4) of the sub-process 104 of the automate 220. Here, the steps 402 include at least: Step 1: Enter Application, Step 2: Enter Sales Doc Type; Step 3: Enter Sales Org; Step 4: Enter Distribution Channel; Step 5: Enter Division; Step 6: Click Continue; Step 7: Enter Sold-To Party; Step 8: Enter Ship-To-Party; and Step 9: Enter Customer Ref. Every step contains an action that is performed as part of the execution of the part of the automate for that sub-process. The metadata 400 may also include an application identifier (ID) for which the automate is executed.

Figure 5:
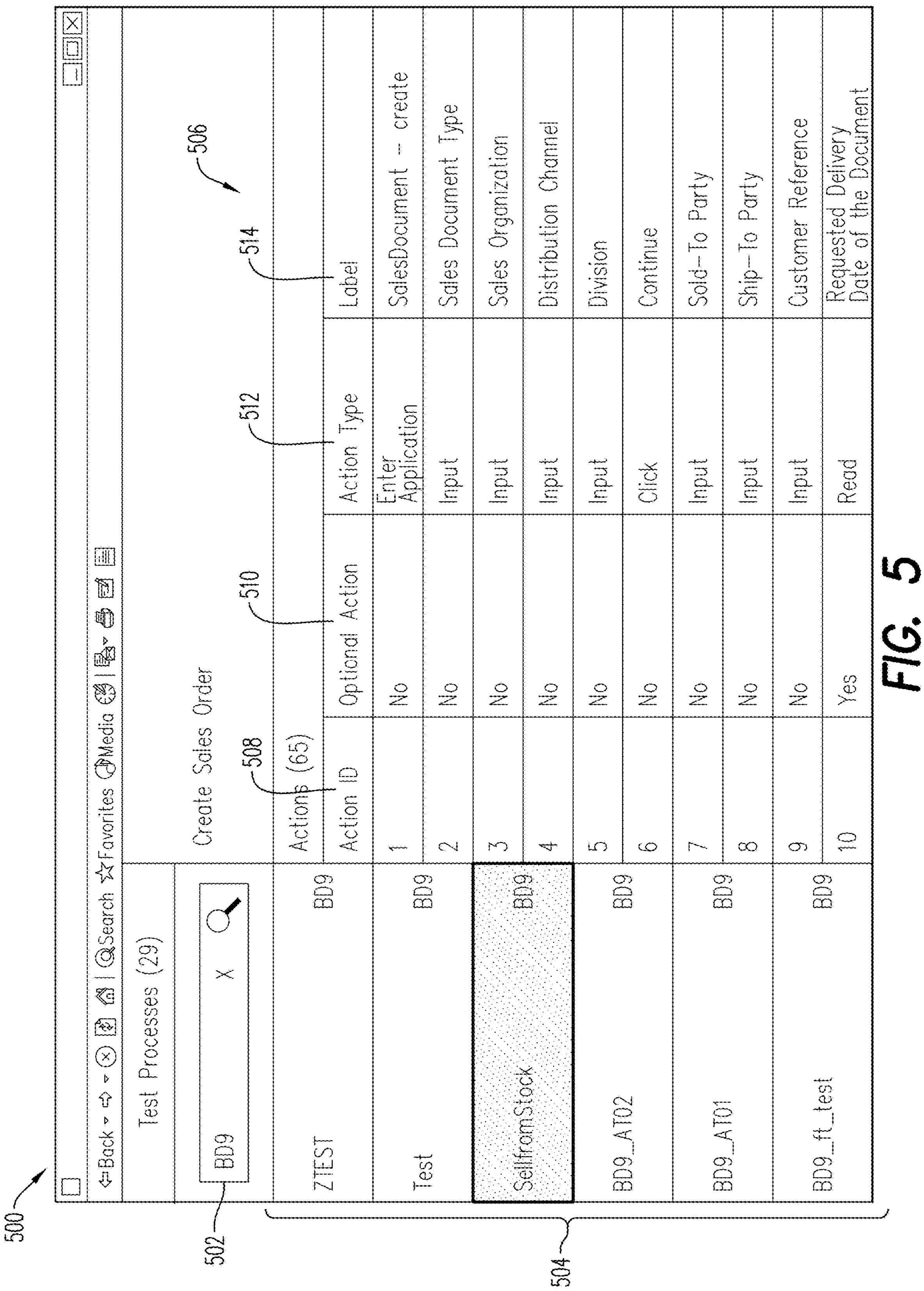
FIG. 5 is a non-exhaustive example of a user interface according to some embodiments.

The metadata 400 may be rendered in a test user interface (UI) 500 (FIG. 5). The test UI 500 includes a test process search element 502 and a search result list 504. Pursuant to some embodiments, a scope item value may be entered in the test process search element 502 to populate the search result list 504. Here, the value entered in the test process search element 502 is "BD9". The system has identified 29 test processes including "BD9", including the Sell from Stock scope for which BD9 is an identifier. The user has selected SellfromStock from the search result list 504 as indicated by the shading. While not shown, the user may be presented with a display including the one or more sub-processes of the selected scope item. The user may then select a sub-process part of the automate to have information for the selected sub-process part of the automate displayed in the test UI 500. Here, the user selected the Create Sales Order sub-process part of the automate, and the steps/actions 402 of the Create Sales Order sub-process part of the automate for testing this sub-process are populated in a table 506. The table 506 includes fields Action ID 508, Optional Action 510, Action Type 512, and Label 514. Other fields may be included. The Action ID 508 describes an identifier for the action/step of the Create Sales Order sub-process 104 part of the automate. The Action ID 508 may be listed in chronological order of execution of the steps during execution of the automate, or in any other suitable order. The Optional Action 510 describes whether the action/step is optional in that it may or may not be an action/step tested during execution of the automate. Action Type 512 describes which action is executed for execution of that step. Here the action types are "enter application", "input," "click," and "read". Other suitable action types may be included. Label 514 describes the name of the step. Here, the labels 514 correspond to the steps 402 in the metadata 400. Continuing with this example the steps include entering into the application, then entering Sales Document type, where the user/test gives some input/value into that field on a UI of the application that was entered, then an input value is received in the Sales Organization field, etc. The input data is received, and then a "Continue" element on the UI is clicked, etc.

For every step 402 included in the Create Sales Order part of the automate, there is a corresponding XML file 222. As described above, the XML file 222 defines the structure and stores the data of the steps in a way that can be easily read by the comparator tool 210 during execution thereof. The XML file 222 encodes the steps in a way that is both human-readable and machine-readable. The XML file 222 contains metadata and the action details describing the action being performed for the step.

Figure 6A:
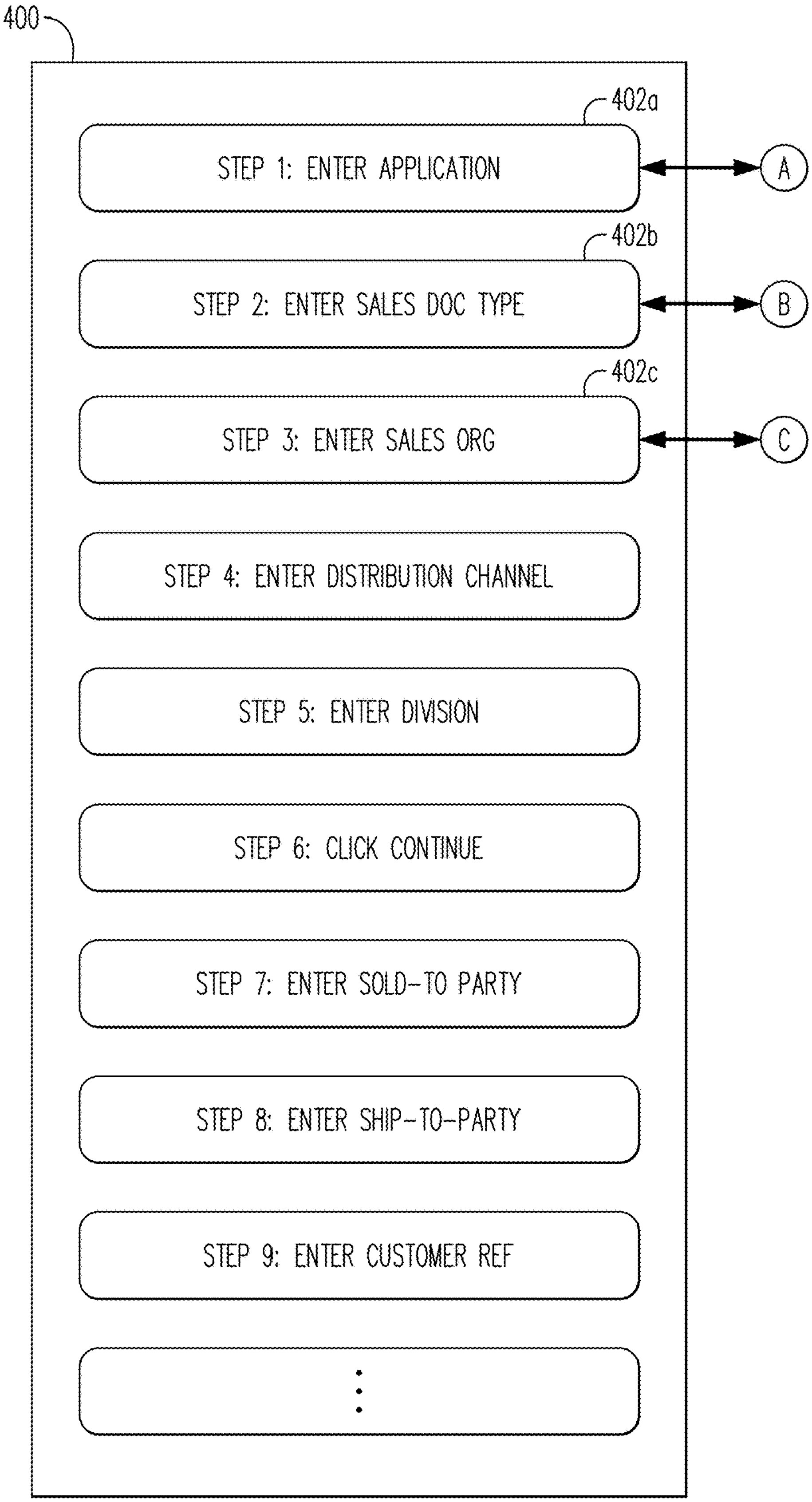
FIG. 6A is a non-exhaustive example of a step-to-XML mapping according to some embodiments.
Figure 6B:
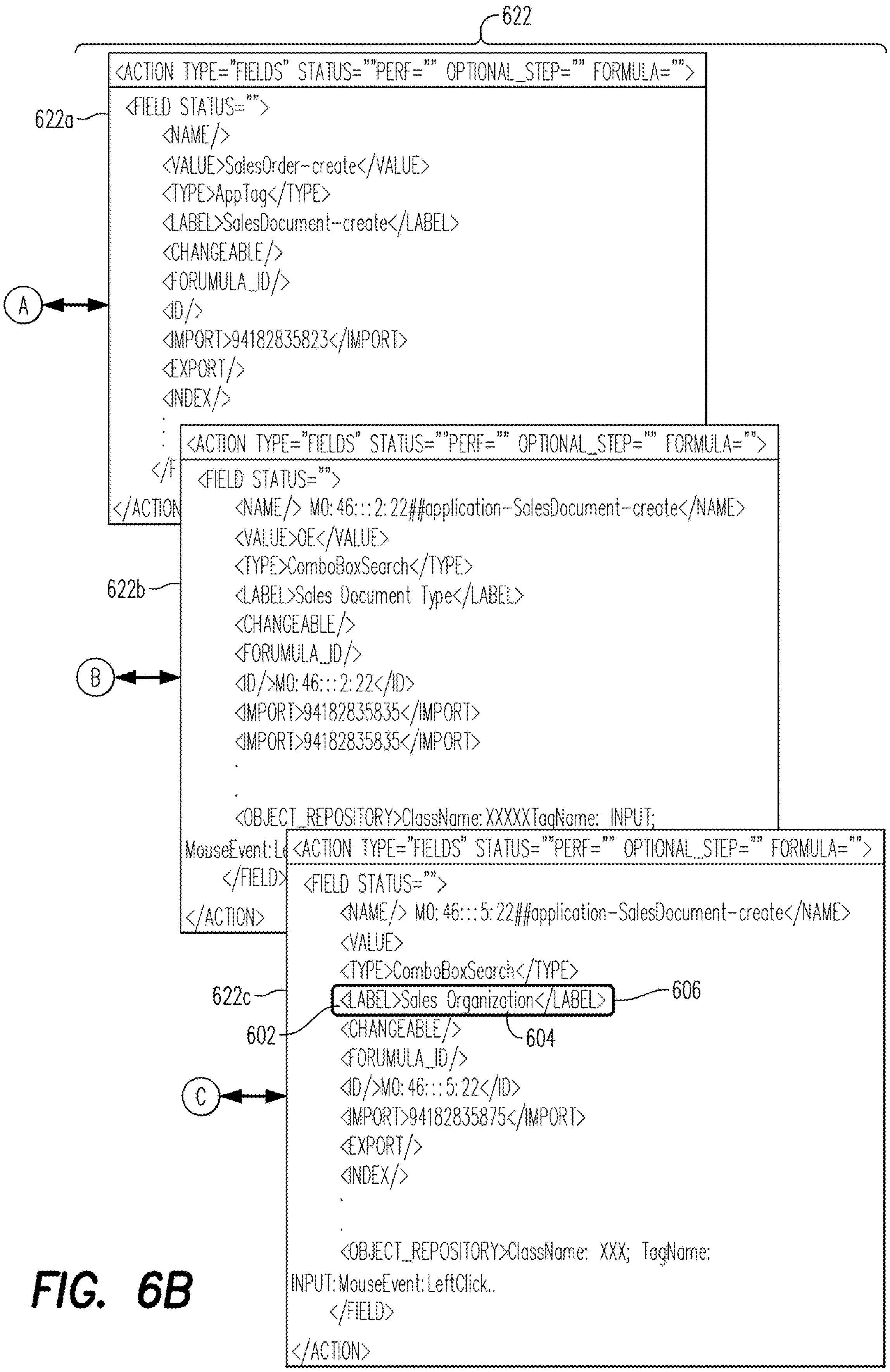
FIG. 6B is a continuation of FIG. 6A according to some embodiments.

FIG. 6A includes the metadata 400 and XML files 622 (FIG. 6B), particularly three XML files 622*a*, 622*b*, 622*c* corresponding, respectively, to the first three steps 402*a*, 402*b*, 402*c* in the metadata 400. Each XML file 622 includes a plurality of keys 602. The key 602 may have a value 604, making a key-value (or node-value) pair 606 (circled in FIG. 6B). The key 602 may be referred to as a "node".

Additionally, prior to the process 300, an update to a first XML file (XML1) of a first automate 222 is received. The update may be an addition, a deletion, or any other suitable update. Herein, the terms "update" and "adaptation" may be used interchangeably. The update to the automate may be in response to an update to a scope item resulting in a corresponding update to the corresponding automate, or the update to the automate may be in response to an update to the automate directly (e.g., a new release, etc.). As described above the first XML file corresponds to a step of a given sub-process part of the first automate.

Continuing with the non-exhaustive example, the update to the XML1 is to the XML file corresponding to Step 3: Enter Sales Org step 402 of the Create Sales Order subprocess 104 part of the first automate 222 corresponding to the Sell from Stock scope 102*a*.

Turning to the process 300, initially, at S310, the updated first XML file and one or more additional XML files (e.g., second XML file) from the data store 214 are received. Each of the one or more additional XML files forms an updated first XML file-additional XML file pair with the updated first XML file.

Then, at S312, it is determined for each updated first XML file-additional XML file pair, whether the application ID for XML1 matches the application ID for the second XML file (XML2). The application ID is a unique identifier for the XML file and may indicate the respective subprocess of the XML file. It is noted the XML file itself includes the step per the label. It is further noted that each step/action may have an identifier that is mapped to the sub-process, and the sub-process may have an identifier mapped to the automate for the scope item, and the scope items have an identifier mapped to the application ID. It is noted that because each level in the hierarchy has IDs mapped to previous levels, a comparison of XML ID to XML ID would not indicate a similarity between the XMLs per se. However, a same application ID indicates the subprocesses from which the XMLs roll-up to may be similar, and it may then be desirable to include the changes from XML1 in XML2, in a case XML1 and XML2 are similar. Pursuant to some embodiments, the matching of S312 determines about 95% of the other XMLs do not match XML1, decreasing the load of further comparison on the comparator tool 210.

In a case it is determined at S312 the application ID for the XML1 does not match the application ID for XML2, the process ends at S314. It is noted that while the process described herein depicts a 1:1 assessment for XML to XML, the comparator tool 210 assesses matchings of the XMLs in the data store 214 in parallel in a 1:n assessment. As such, while the process for this second XML ends, the process for a third, fourth, fifth, etc. XML may continue.

In a case it is determined at S312 the application ID for the XML1 does match the application ID for the XML2, the process proceeds to S316 and an XML similarity score 224 is generated. The XML similarity score 224 is generated for each first XML file-additional XML file pair. The XML similarity score 224 is a score that indicates how similar the first XML is to the second XML. The XML similarity score 224 is generated based on node similarity scores as will be described further below with respect to FIG. 8.

Then in S318 it is determined whether the XML similarity score exceeds a threshold value. The threshold value may be set by an administrator or developer. Above a certain threshold value, this particular pair of XMLs (XML1 and XML2) are similar enough to be considered equal. As described above, this process runs in parallel for multiple XMLs, such that one XML is compared to n-XMLs.

In a case it is determined at S318 that the XML similarity score does not exceed the threshold, the process 300 returns to S314 and ends for this comparison. In a case it is determined at S318 that the XML similarity score does exceed the threshold, the process 300 proceeds to S320 and a similarity notification 702 (FIG. 7) is generated and transmitted to the user 202. The similarity notification 702 indicates any additional XML files that are similar to the updated first XML file.

Figure 7:
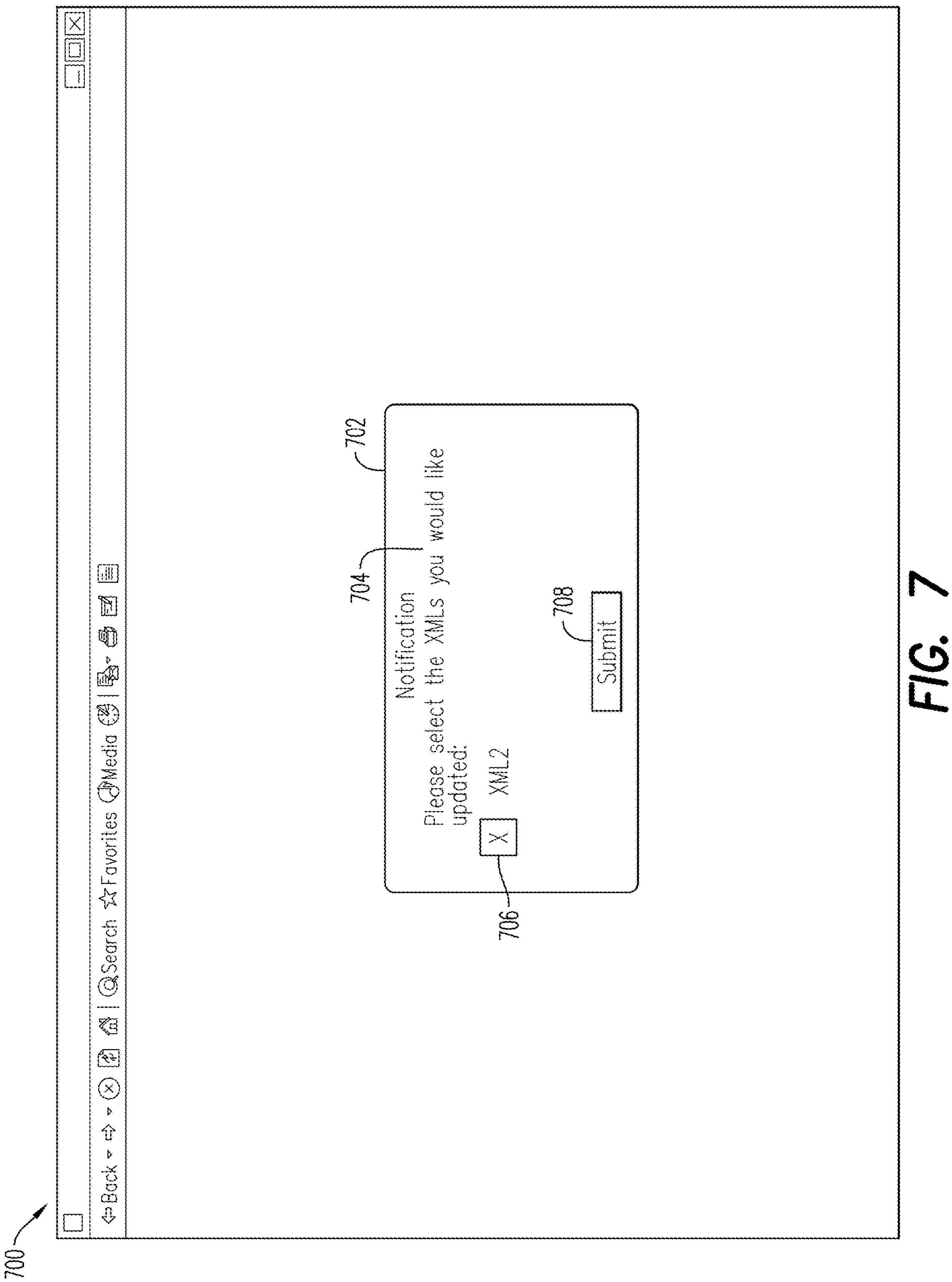
FIG. 7 is a non-exhaustive example of a notification according to some embodiments.

The notification 702 included in the user interface 700 of FIG. 7 includes a message 704 instructing the user to select the other XMLs they would like to change so they include the same updates that were made to XML1. In some cases, the notification 702 may include a list of XMLs that are available to change to include the update to XML1. The list of XMLs may include XML2 and/or the additional XMLs assessed in parallel. In S322 it is determined whether the change should be permeated to any other XMLs. The user may select a checkbox element 706 or any other suitable UI element to indicate if they would like to permeate the change. The user may select all of the other XMLs, none of the other XMLs, less than all of the other XMLs in which to permeate the update. In some cases, by default, all of the check box elements are checked and the user may select the XMLs they do not want to receive the update by removing the check. In a case the user selects to permeate the change in none of the other XMLs (e.g., the user does not select any checkbox elements 706 (not shown) and then selects the Submit element 708), the process 300 returns to S314 and ends. In a case the user selects to permeate the change in at least one of the additional XMLs (e.g., the user selects at least one checkbox element 706 and then selects the Submit element 708), the comparator tool 210 copies the updates from the updated first XML into the XML files of the selected additional XMLs in S324. The updated XMLs are saved to the data store 214 in S326. After the updated XMLs are saved in the data store 214, when the user executes the automate, the automate calls to the data store 214 to retrieve the updated XMLs.

Figure 8:
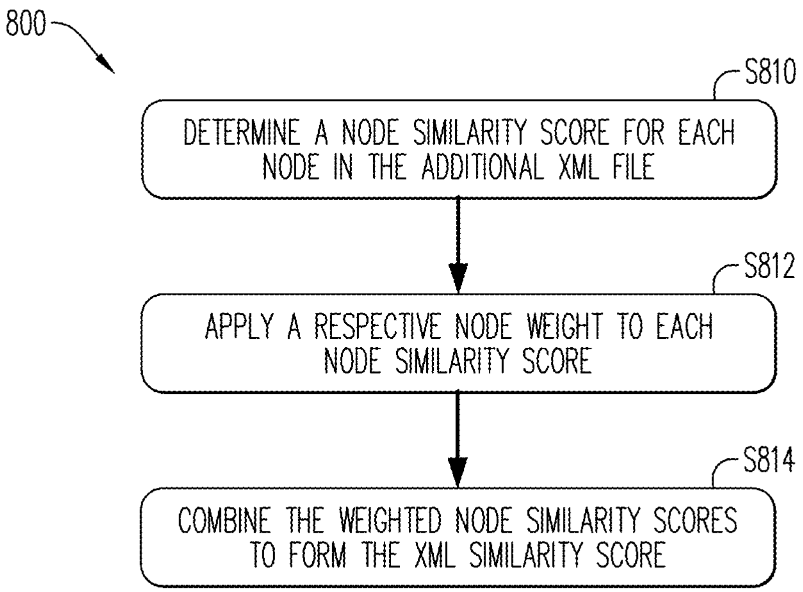
FIG. 8 is a flow diagram of a second process according to some embodiments.

FIG. 8 illustrates a process 800 for generating the XML similarity score 224 in accordance with an example embodiment.

Figure 9:
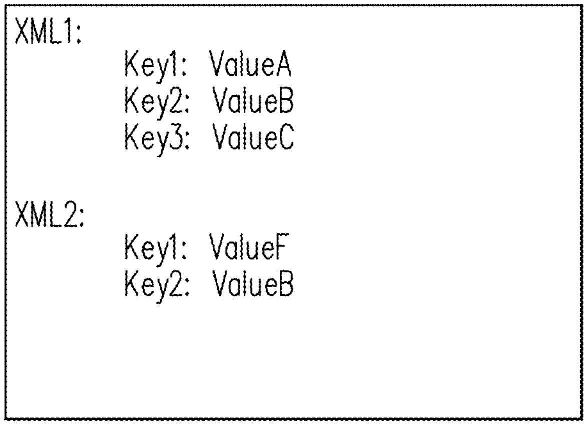
FIG. 9 is another non-exhaustive example according to some embodiments.

Initially, at S810, a node similarity score 226 is generated for each common key in XML2. As described above, the key may be referred to as a "node". A common key is a same key in both XML1 and XML2. As a non-exhaustive example, consider the two XMLs in FIG. 9—XML1 and XML2. Key1 is included in both XML1 and XML2 and is a common key, similarly Key2 is included in both XML1 and XML2 and is a common key. Key 3 is in XML1 and not in XML2, so Key3 is not a common key. In some embodiments Key 3 would not have a similarity score generated for it, but in a case it did have a node similarity score, the node similarity score would be zero.

The node similarity score 226 is calculated as a normalized score of a Levenshtein distance between two values for the common keys. Continuing with the example in FIG. 9, a Levenshtein distance is calculated as the distance between Value A and Value F for common Key1; and a Levenshtein distance is calculated as the distance between Value B and Value B for common Key 2. Levenshtein distance is a number that tells you how different two strings (values) are. The higher the number, the more different two strings (values) are. For example, the Levenshtein distance between "kitten" and "sitting" is 3 since, at minimum, 3 edits are required to change one into the other (e.g., 1. Kitten→Sitten (substitution of "s" for "k"), 2. Sitten→Sittin (substitution of "i" for "e"), and 3. Sittin→Sitting (insertion of "g" at the end).

The Levenshtein Distance equation is:

$$lev_{a,b}(i,j)=\begin{cases}\max(i,j) & \text{if } \min(i,j)=0,\\ \min\begin{cases}lev_{a,b}(i-1,j)+1\\ lev_{a,b}(i,j-1)+1\\ lev_{a,b}(i-1,j-1)+1_{(a_i\neq b_j)}\end{cases} & \text{otherwise.}\end{cases}$$

Where "a" is string #1, "b" is string #2, "i" is the terminal character position of string #1, and "j" is the terminal character position of string #2.

Normalization of the Levenshtein Distance for each pair of values for the respective common key results in a real number between zero and one. The normalized Levenshtein distance is the node similarity score 226.

Then in S812, a respective node weight is applied (e.g., multiplied) to each node similarity score 226. Each node has an assigned weight, where the weight indicates the importance of the node in determining the similarity of XML1 to XML2. The weight may be determined by a developer or administrator. The weighted node similarities scores are added together to generate the XML similarity score 224. In some cases, the XML similarity score is initialized to zero after the XML1 and XML2 are selected in S312. Then each weighted node similarity score is added to the XML similarity score as it is generated.

As noted above, the processes described herein for an analysis of XML1 to XML2 may be executed in parallel for other XMLs. Pursuant to some embodiments, a scheduler (not shown) may create execution jobs (e.g., determining common application IDs, determining a weighted node similarity score, determining an XML similarity score, etc.) and schedule the execution jobs on one or more worker nodes/virtual machines, such that the execution jobs may be executed in parallel, thereby executing a 1:n update of the XML files instead of a 1:1 update. The result/output of the execution jobs may be posted to the automator backend application 208, and then persisted (via the data store 214).

Figure 10:
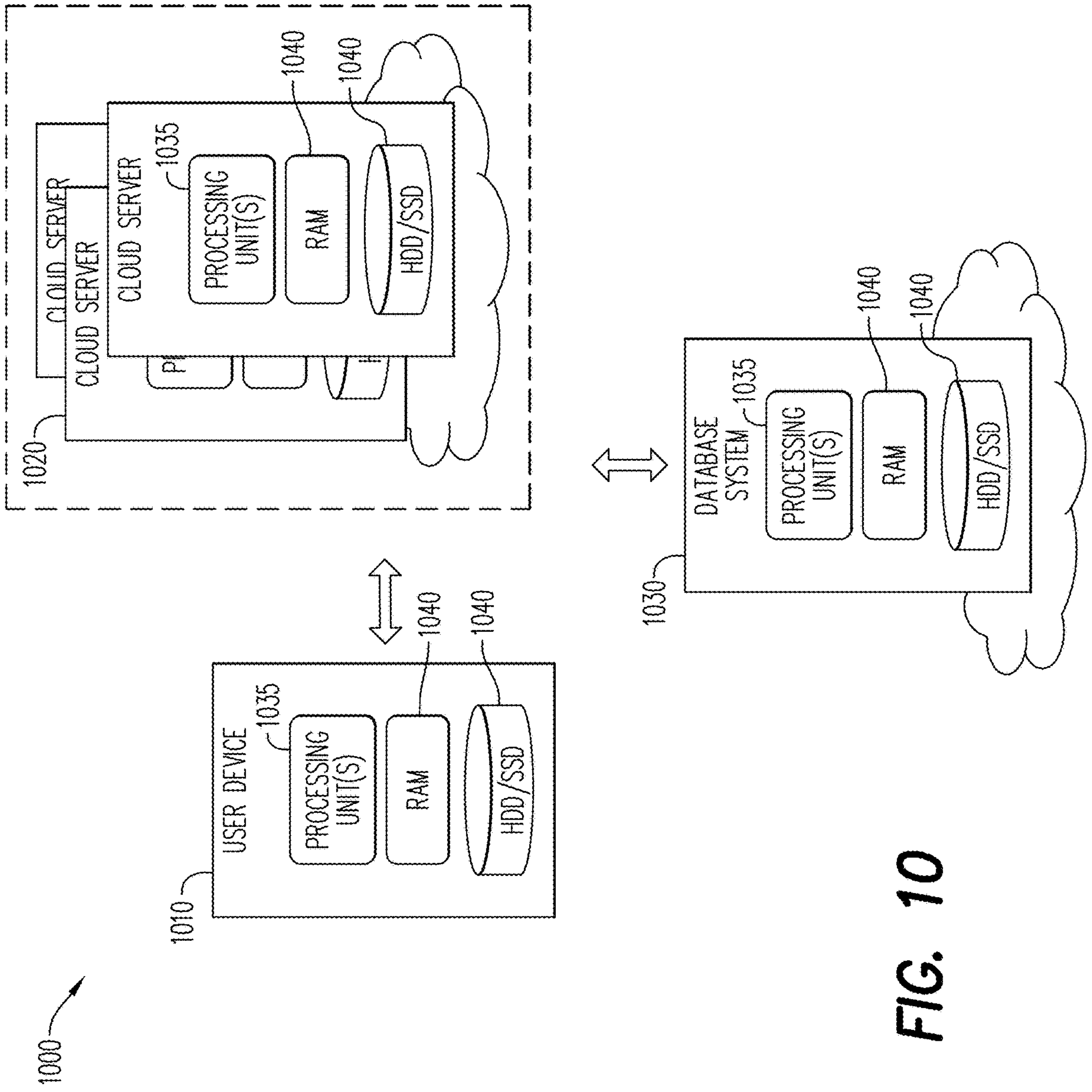
FIG. 10 is a block diagram of a cloud-based database deployment architecture according to some embodiments.

FIG. 10 illustrates a cloud-based database deployment 1000 according to some embodiments. The illustrated components may reside in one or more public clouds providing self-service and immediate provisioning, autoscaling, security, compliance and identity management features.

User device 1010 may interact with applications executing on the cloud server 1020, for example via a Web Browser executing on user device 1010, in order to determine an XML similarity score for two XMLs based on data managed by a database system 1030. Database system 1030 may store data as described herein and may execute processes as described herein to cause the creation of the node similarity score and the XML similarity score. Cloud server 1020 and database system 1030 may comprise cloud-based compute resources, such as virtual machines, allocated by a public cloud provider. As such, cloud server 1020 and database system 1030 may be subjected to demand-based resource elasticity. Each of the user device 1010, cloud server 1020, and database system 1030 may include a processing unit 1035 that may include one or more processing devices each including one or more processing cores. In some examples, the processing unit 1035 is a multicore processor or a plurality of multicore processors. Also, the processing unit 1035 may be fixed or it may be reconfigurable. The processing unit 1035 may control the components of any of the user device 1010, cloud server 1020, and database system 1030. The storage devices 1040 may not be limited to a particular storage device and may include any known memory device such as RAM, ROM, hard disk, and the like, and may or may not be included within a database system, a cloud environment, a web server or the like. The storage device 1040 may store software modules or other instructions/executable code which can be executed by the processing unit 1035 to perform the method shown in FIGS. 3 and 8. According to various embodiments, the storage device 1040 may include a data store having a plurality of tables, records, partitions and sub-partitions. The storage device 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a plurality of automates;

a data store storing the plurality of automates and one or more Extensible Markup Language (XML) files for each automate, wherein each XML file includes a plurality of node-value pairs;

a memory storing processor-executable program code; and a processing unit to execute the processor-executable program code to cause the system to:

receive an updated first XML file and one or more additional XML files from the data store, wherein each of the one or more XML files forms an updated first XML file-additional XML file pair with the updated first XML file;

determine, for each updated first XML file-additional XML file pair, an identifier of the updated first XML file matches an identifier of the additional XML;

generate an XML similarity score for each first XML file-additional XML file pair;

determine the XML similarity score exceeds a threshold value indicating the updated first XML file is similar to the additional XML file of the first XML file-additional XML file pair;

generate a similarity notification indicating any additional XML files that are similar to the updated first XML file; and update, via created execution jobs executing on one or more worker nodes, 1:n additional XML files of the first XML file-additional XML file pair with a copy of the updates from the updated first XML file, wherein n is at least two, the update is in parallel and the update is in a case the XML similarity score exceeds the threshold value, wherein the copied update results in each additional XML file matching the updated first XML file of the first XML file-additional XML file pair.

2. The system of claim 1, wherein the XML similarity scores generated for each first XML file-additional XML file pair are generated in parallel.

3. The system of claim 1, further comprising program code to cause the system to:

save each updated XML file in the data store.

4. The system of claim 1, wherein the update to the additional XML file is in response to selection of a user interface element.

5. The system of claim 1, wherein generating the XML similarity score further comprises program code to cause the system to:

determine a node similarity score for each node-value pair in the additional XML file based on a comparison of each node-value pair in the additional XML file to each node-value pair in the updated first XML file;

apply a respective node weight to each node similarity score; and combine the weighted node similarity scores, wherein the combined weighted node similarity scores are the XML similarity score.

6. The system of claim 5, wherein the node similarity score is a normalized Levenshtein distance.

7. The system of claim 1, wherein each automate is adapted to test a scope item, the scope including one or more sub-processes.

8. The system of claim 7, wherein prior to receipt of the updated first XML file, an update to the scope item is received, and an update to a first XML file is based on the update to the scope item.

9. A computer-implemented method comprising:

receiving an updated first XML file and one or more additional XML files from a data store, wherein each of the one or more XML files forms an updated first XML file-additional XML file pair with the updated first XML file;

determining, for each updated first XML file-additional XML file pair, an identifier of the updated first XML file matches an identifier of the additional XML;

generating an XML similarity score for each first XML file-additional XML file pair, wherein the XML similarity scores generated for each first XML file-additional XML file pair are generated in parallel;

determining the XML similarity score exceeds a threshold value indicating the updated first XML file is similar to the additional XML file of the first XML file-additional XML file pair;

generating a similarity notification indicating any additional XML files that are similar to the updated first XML file; and updating, via created execution jobs executing on one or more worker nodes, 1:n additional XML files of the first XML file-additional XML file pair with a copy of the updates from the updated first XML file, wherein n is at least two, the update is in parallel and the update is in a case the XML similarity score exceeds the threshold value, wherein the copied update results in each additional XML file matching the updated first XML file of the first XML file-additional XML file pair.

10. The method of claim 9, wherein the update to the additional XML file is in response to selection of a user interface element.

11. The method of claim 9, wherein generating the XML similarity score further comprises:

determining a node similarity score for each node in the additional XML file based on a comparison of each node in the additional XML file to each node-value pair in the updated first XML file;

applying a respective node weight to each node similarity score; and combining the weighted node similarity scores, wherein the combined weighted node similarity scores are the XML similarity score.

12. The method of claim 11, wherein the node similarity score is a normalized Levenshtein distance.

13. The method of claim 9, wherein each automate is adapted to test a scope item, the scope including one or more sub-processes.

14. The method of claim 13, wherein prior to receipt of the updated first XML file, an update to the scope item is received, and an update to a first XML file is based on the update to the scope item.

15. One or more non-transitory, computer-readable medium storing instructions, that, when executed by a computing system, cause the computing system to perform operations comprising:

receiving an updated first XML file and one or more additional XML files from a data store, wherein each of the one or more XML files forms an updated first XML file-additional XML file pair with the updated first XML file;

determining, for each updated first XML file-additional XML file pair, an identifier of the updated first XML file matches an identifier of the additional XML;

generating an XML similarity score for each first XML file-additional XML file pair, wherein the XML similarity scores generated for each first XML file-additional XML file pair are generated in parallel;

determining the XML similarity score exceeds a threshold value indicating the updated first XML file is similar to the additional XML file of the first XML file-additional XML file pair;

generating a similarity notification indicating any additional XML files that are similar to the updated first XML file; and updating, via created jobs executing on one or more worker nodes, 1:n additional XML files of the first XML file-additional XML file pair with a copy of the updates from the updated first XML file, wherein n is at least two, the update is in parallel and the update is in a case the XML similarity score exceeds the threshold value, wherein the copied update results in each additional XML file matching the updated first XML file of the first XML file-additional XML file pair.

16. The media of claim 15, wherein generating the XML similarity score further comprises:

determining a node similarity score for each node in the additional XML file based on a comparison of each node in the additional XML file to each node-value pair in the updated first XML file;

applying a respective node weight to each node similarity score; and combining the weighted node similarity scores, wherein the combined weighted node similarity scores are the XML similarity score.

17. The media of claim 16, wherein the node similarity score is a normalized Levenshtein distance.

* * * * *